Patented Jan. 15, 1935

1,987,743

UNITED STATES PATENT OFFICE 1,987,743

COMPOUNDS OF PRIMULA SAPONINE

Helmut Legerlotz, Berlin-Friedenau, Germany, assignor to P. Beiersdorf & Co. Inc., New York, N. Y.

No Drawing. Original application November 17, 1932, Serial No. 643,125. Divided and this application June 8, 1933, Serial No. 674,963. In Germany January 19, 1928

7 Claims. (Cl. 260—25)

This invention, which is a division of my copending application Ser. No. 643,125 relates to the manufacture of valuable compounds of primula saponine and has for its main object the manufacture of stable and valuable salts of primula saponine suitable for therapeutic purposes especially as an expectorant or a constituent of expectorant compositions.

Plants of the primula species contain a saponine, which is insoluble in water and may be recovered by extraction of vegetable primula drugs, especially radix primula. The acid character of this saponine is known, as sodium and potassium salts of primula saponine have already been prepared.

I have now ascertained that the primula saponine is a comparatively strong acid and forms well defined and stable salts with weak organic bases such as methyl amine, codeine, morphine and the like, said salts being of high therapeutic value. I have also ascertained that esters, such as ethyl ester, benzyl ester and the like of primula saponine may be manufactured by usual esterification methods.

Examples 1. 1,0 g. of primula saponine with 5 ccm. of alcohol are triturated with 3,0 g. of a 40% methyl amine solution. The methyl amine salt of primula saponine precipitates. It is easily soluble in water, difficultly soluble in alcohol and melts at 227 to 228° C. while decomposing. On boiling it with sodium hydroxide solution methyl amine is split off.

2. A concentrated aqueous solution of 1,23 g. of ammonium salt of primula saponine is mixed with an aqueous solution of 0,371 g. codeine hydrochloride. The mixture is concentrated at about 30 to 35° C. On standing the codeine salt of primula saponine precipitates. This salt is white in appearance, slightly soluble in water and alcohol and melts while decomposing at 236° C. On boiling it with water containing some nitric acid the free primula saponine is obtained.

3. 1.25 g. of ammonium salt of primula saponine are reacted in the same manner as in Example 2 with 0,375 g. of morphine hydrochloride. 1,5 g. of morphine salt of primula saponine, melting at 222° C. are at once separating from the liquid.

The foregoing detailed examples have been given for clearness of understanding only, and no unnecessary limitations should be understood therefrom, but the appended claims should be construed as broadly as permissible in view of the prior art.

I claim:

1. Codeine salt of primula saponine being a white substance melting at 236° C.

2. Morphine salt of primula saponine melting at 222° C.

3. A method for making codeine salt of primula saponine which consists in reacting ammonium salt of primula saponine with codeine hydrochloride in presence of water and separating the codeine salt of primula saponine formed from the liquid.

4. A method for making morphine salt of primula saponine which consists in reacting ammonium salt of primula saponine with morphine hydrochloride in presence of water and separating the morphine salt formed from the liquid.

5. A salt of primula saponine with a substance selected from the group consisting of morphine and codeine, said salt being stable and therapeutically valuable.

6. A method for making stable compounds of primula saponine which consists in neutralizing primula saponine with a substance selected from the group consisting of morphine and codeine.

7. A method for making stable compounds of primula saponine which consists in neutralizing alcoholic extracts containing primula saponine with a substance selected from the group consisting of morphine and codeine, recovering the salts formed, and purifying said salts by recrystallization.

HELMUT LEGERLOTZ.